(12) United States Patent
Magidson et al.

(10) Patent No.: US 9,811,333 B2
(45) Date of Patent: Nov. 7, 2017

(54) USING A VERSION-SPECIFIC RESOURCE CATALOG FOR RESOURCE MANAGEMENT

(71) Applicant: Microsoft Technology Licensing, LLC, Redmond, WA (US)

(72) Inventors: Victor Magidson, Issaquah, WA (US); Christopher Miceli, Redmond, WA (US); Alex Bulankou, Redmond, WA (US); Adri Verlaan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 14/747,542

(22) Filed: Jun. 23, 2015

(65) Prior Publication Data
US 2016/0378440 A1    Dec. 29, 2016

(51) Int. Cl.
*G06F 9/45* (2006.01)
*G06F 9/44* (2006.01)

(52) U.S. Cl.
CPC ..................................... *G06F 8/71* (2013.01)

(58) Field of Classification Search
None
See application file for complete search history.

(56) References Cited

U.S. PATENT DOCUMENTS

| | | | |
|---|---|---|---|
| 6,098,079 A | 8/2000 | Howard | |
| 7,373,345 B2 | 5/2008 | Carpentier et al. | |
| 7,660,853 B2 | 2/2010 | Scott et al. | |
| 7,711,958 B2 | 5/2010 | Carro | |
| 7,849,106 B1 | 12/2010 | Agrawal et al. | |
| 8,903,838 B2 | 12/2014 | Hunter et al. | |
| 9,038,033 B1* | 5/2015 | Hidayat | G06F 8/433 717/126 |
| 9,148,475 B1* | 9/2015 | Mealey | G06F 17/30979 |
| 2007/0033588 A1* | 2/2007 | Landsman | G06F 17/30899 717/178 |
| 2008/0010588 A1 | 1/2008 | Wake et al. | |
| 2009/0232304 A1* | 9/2009 | King | G06F 21/125 380/210 |
| 2010/0306207 A1 | 12/2010 | Li et al. | |

(Continued)

FOREIGN PATENT DOCUMENTS

WO    2013062223 A1    5/2013

OTHER PUBLICATIONS

Armstrong, Joe, "The Web of Names, Hashes and UUIDs", Published on: Mar. 12, 2015, Available at: http://joearms.github.io/2015/03/12/The_web_of_names.html.

(Continued)

*Primary Examiner* — Tuan Dao
*Assistant Examiner* — William C Wood
(74) *Attorney, Agent, or Firm* — Christopher J. Volkmann; Kelly, Holt & Christenson, PLLC

(57) ABSTRACT

Once a set of inter-dependent items are generated (such as compiled), each of the items is re-named with a content-based name that is generated for each of those items. A version-specific catalog of the inter-dependent items is generated, that maps an item identifier to the content-based name for each item. The re-named items and the version-specific catalogs are loaded to a publication system for consumption.

19 Claims, 9 Drawing Sheets

(56) References Cited

U.S. PATENT DOCUMENTS

2012/0151450 A1* 6/2012 Saffer ................ G06F 11/3664
　　　　　　　　　　　　　　　　　　　　　717/128
2013/0227209 A1　 8/2013 Czerkowicz et al.
2015/0169294 A1* 6/2015 Brock .................... G06F 11/36
　　　　　　　　　　　　　　　　　　　　　717/164

OTHER PUBLICATIONS

"XQuery/Finding Duplicate Documents", Published on: Jun. 23, 2013, Available at: http://en.wikibooks.org/wiki/XQuery/Finding_Duplicate_Documents.

Torres, Andres, "Hashing Files with Python", Published on: May 16, 2013; Available at: http://www.pythoncentral.io/hashing-files-with-python/.

Rouse, Margaret, "XSD (XML Schema Definition)", Published at: Sep. 2005, Available at: http://searchsoa.techtarget.com/definition/XSD.

Skonnard, Aaron, "A Quick Guide to XML Schema", Published on: Apr. 2002, Available at: https://msdn.microsoft.com/en-us/magazine/cc302086.aspx.

* cited by examiner

USING A VERSION-SPECIFIC RESOURCE CATALOG FOR RESOURCE MANAGEMENT

BACKGROUND

Computer systems are currently in wide use. Some such computer systems use a cross-code computing component to operate on multiple different items of code.

For example, a compiler may compile multiple items of code together with one another. Similarly, a minifier may also operate on multiple items of code. These types of cross-code operations (e.g., compiling, minification, etc.) can sometimes take advantage of inter-item dependencies. For instance, when a compiler compiles multiple items of high level code in order to generate resources, the compiler may often be aware of dependencies or other commonalities or other characteristics of the items being compiled, and take advantage of those things, in performing the compiling process. This is done because it makes the outcome of the compilation better optimized (in terms of size and speed).

However, such cross-code operations result in compiled items that have a hard dependency on one another. For instance, when three items of high level code are compiled to generate a set of compiled resources, the compiled resources will have values that are not necessarily consumable with resources that were compiled during a different build or compile operation. This is because the high level code for one of the items may have changed, and therefore the compiled values for each of the compiled resources may not necessarily be the same. Thus, a consumer can only be certain that a compiled resource will be consumable with other resources that were compiled during the same build operation.

User agents that use these items (e.g., the compiled resources) may be applications that take advantage of browsers that have a browser cache. The user agent normally attempts to ensure that it is only using compiled items that are compatible or consumable with one another. This can make consuming compiled items that are compiled as a group (such as resources) difficult and cumbersome.

The discussion above is merely provided for general background information and is not intended to be used as an aid in determining the scope of the claimed subject matter.

SUMMARY

Once a set of inter-dependent items are generated (such as compiled), each of the items is re-named with a content-based name that is generated for each of those items. A version-specific catalog of the inter-dependent items is generated, that maps an item identifier to the content-based name for each item. The re-named items and the version-specific catalogs are loaded to a publication system for consumption.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
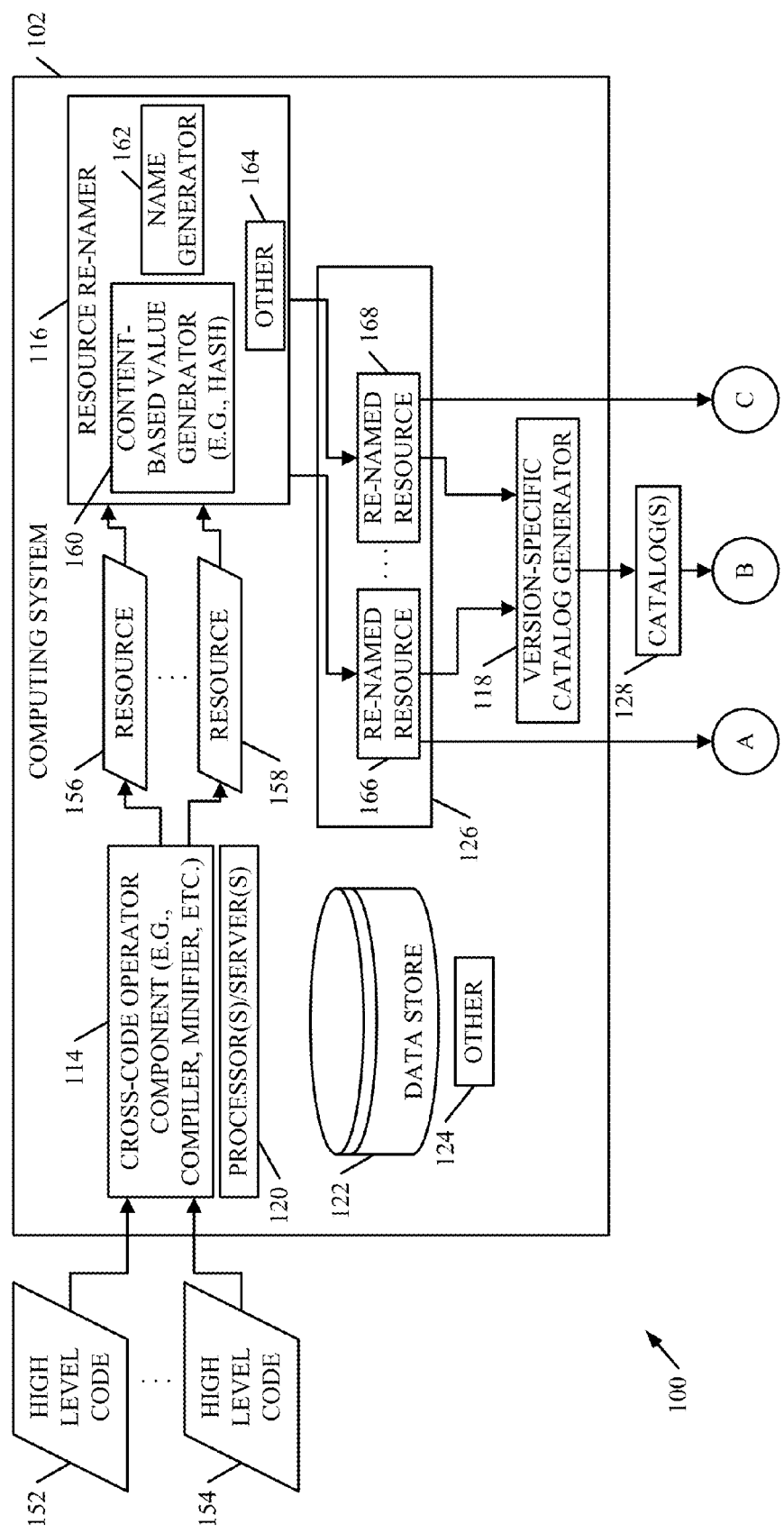
FIGS. 1A and 1B (collectively referred to as FIG. 1) show a block diagram of one example of a computing system architecture.
Figure 1B:
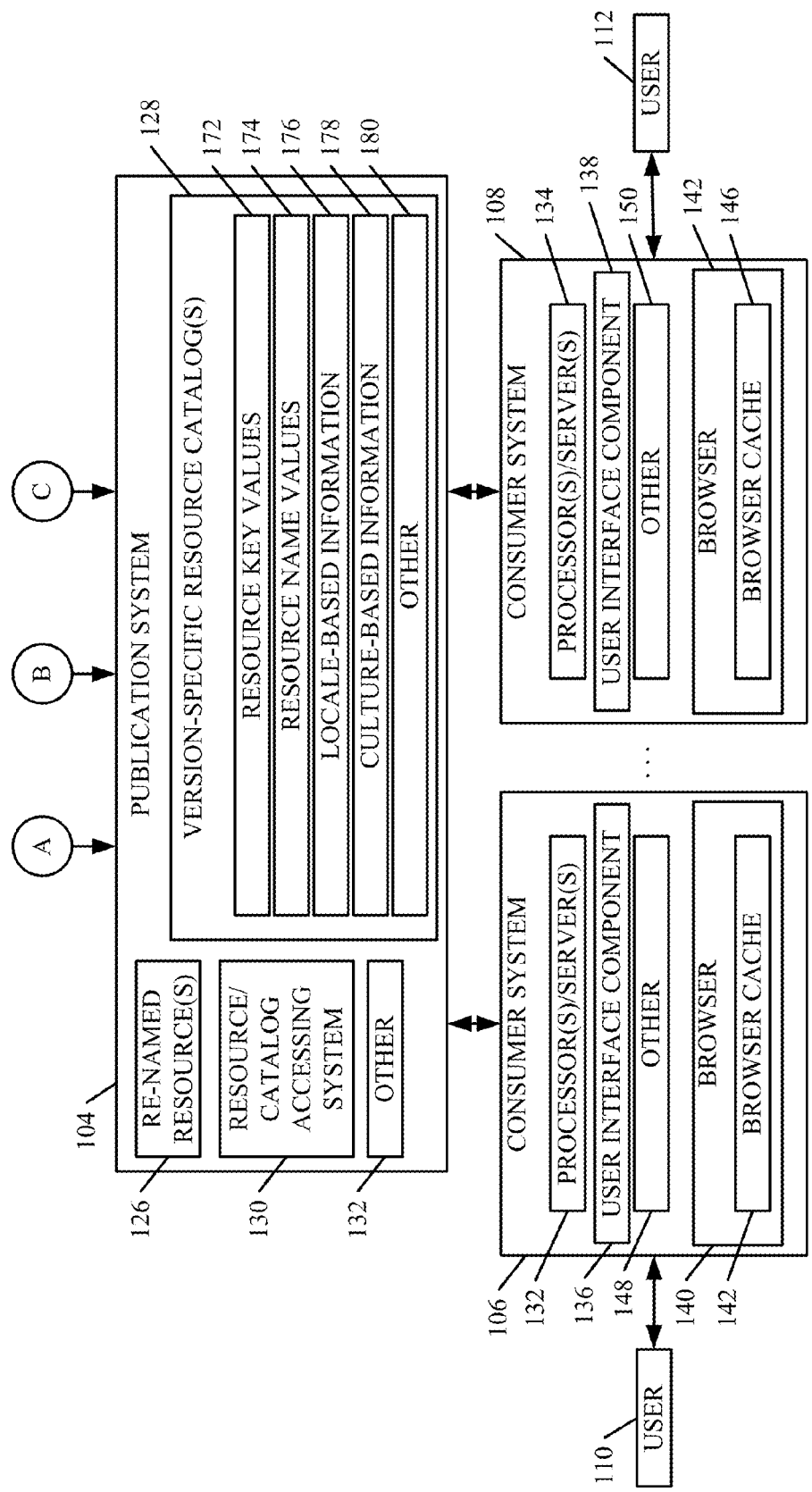

FIGS. 1A and 1B (collectively referred to as FIG. 1) show a block diagram of one example of a computing system architecture 100. Architecture 100 illustratively includes computing system 102, publication system 104 and a set of consumer systems 106-108 that are shown being accessed by users 110-112, respectively. Computing system 102 illustratively includes cross-code operator component 114, resource re-namer 116, version-specific catalog generator 118, one or more processors or servers 120, data store 122, and it can include other items 124.

Publication system 104 illustratively stores a set of re-named resources 126, one or more version-specific catalogs 128, resource/catalog accessing system 130, and it can include other items 132. Publication system 104 is illustratively accessed by consumer systems 106-108 which can each include user interface components 136-138, browsers 140-142, which each can include a browser caches 144-146, and they can include other items 148-150, respectively.

Before describing the overall operation of architecture 100, a brief overview will first be provided. Cross-code operator component 114 illustratively receives a set of high level code items 152-154, and operates on those items. By way of example, component 114 can be a compiler, a minifier or any combination of these, etc. For example, component 114 may be a compiler that compiles items of high level code 152-154 to obtain a set of compiled resources 156-158. It will be noted that there is not necessarily a 1-to-1 correspondence between code items 152-154 and resources 156-158. However, component 114 illustratively takes advantage of dependencies and other characteristics of high level code items 152-154 in performing its cross-code operations. Therefore, it may introduce a dependency among compiled resources 156-158.

Resource re-namer 116 illustratively includes a content-based value generator 160, name generator 162, and it can include other items 164. Content-based value generator 160 illustratively generates a content-based value for each of the resources 156-158. Name generator 162 re-names each resource 156-158 so that it includes a representation of the content-based value. This is described in greater detail below. Resource re-namer 116 thus generates a set of re-named resources 166-168 based on resources 156-158. The set of resources is referred to by number 126, for ease of reference. It provides the re-named resources 126 both to version-specific catalog generator 118 and to publication system 104.

Version-specific catalog generator 118 illustratively generates one or more version-specific catalogs 128 from the re-named resources 126. Generator 118 then provides catalogs 128 to publication system 104. Catalog 128 can illustratively include a resource key value (which may be a resource identifier) 172. It can also illustratively include a resource name value 174 which is the name provided by resource re-namer 116. Thus, the name value 174 includes the content-based value generated for the corresponding resource 156-158.

Catalog 128 can also include locale-based information 176, culture-based information 178 and other information 180. The locale-based information 176 may identify a specific language spoken at the given locale to which the resource corresponds. The culture-based information 178 may indicate the culture, itself, and whether the culture reads left-to-right, or right-to-left, or vertically. These are only two examples of the different locale-based information and culture-based information that can be included in catalog 128.

Resource/catalog accessing system 130 illustratively provides access to the catalog 128 and resources 126 to consumer systems 106-108. For instance, browsers (or applications running in the browsers) 140-142 can use system 130 to access catalogs 128 and the re-named resources 126 on publication system 104. Also, the catalogs 128 and resources 126 can be accessed by a server, on the server side. All of these architectures are contemplated herein. The present discussion will proceed with respect to servers 120 accessing the catalogs 128 and browsers 140-142 accessing the resources 126, for the sake of example. It will be noted however, that, when referring to browsers accessing the resources, it will be appreciated that this could also mean applications running in the browsers. In any case, the browsers 140-142 can use the resource IDs (e.g., the key values) 172 to obtain the name values 174 for the various resources that are to be downloaded. They can of course use the locale-based information 176 and culture-based information 178 as well. Once they have the name of the resource, they can access the re-named resource 126 and download it (if needed) and store it in browser caches 144-146, respectively.

Figure 2:
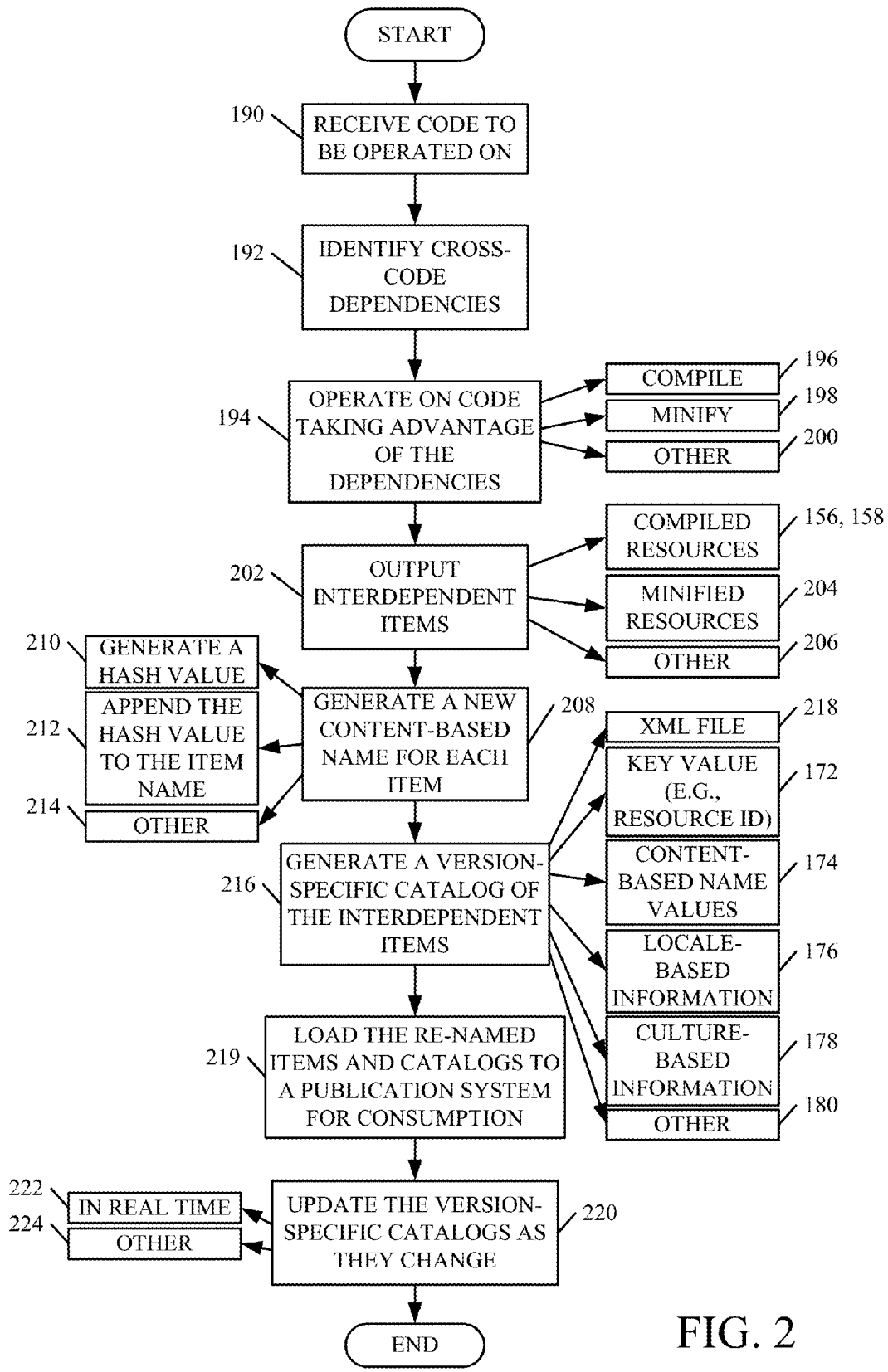
FIG. 2 is a flow diagram illustrating one example of the operation of the architecture shown in FIG. 1, in generating items with content-based names and a version-specific catalog of those items.

FIG. 2 is a flow diagram illustrating one example of the operation of computing system 102 in generating the re-named resources 166-168 and the catalogs 128, in more detail. FIGS. 1 and 2 will now be described in conjunction with one another.

Cross-code operator component 114 first receives the code items 152-154 to be operated on. This is indicated by block 190 in FIG. 2.

In doing so, component 114 identifies any cross-code dependencies or other characteristics that can be used to perform its operations. This is indicated by block 192. Component 114 then operates on the code items 152-154 taking advantage of the dependencies or other identified characteristics. This is indicated by block 194. As discussed above, component 114 can compile those items as indicated by block 196. It can minify them as indicated by block 198, or it can perform other cross-code operations as indicated by block 200.

Ultimately, component 114 outputs interdependent items, such as a set of compiled resources 156-158. Outputting the interdependent items is indicated by block 202. The interdependent items can be compiled resources 156-158, they can be minified resources represented by 204 in FIG. 2, or other items 206.

Resource re-namer 116 then generates a content-based name for each of the items 156-158. This is indicated by block 208. In one example, content-based value generator 160 is a hash generator. It generates a hash value for each resource 156-158. The hash value will thus be specific to the particular content of the corresponding resource. Generating a hash value for each resource is indicated by block 210.

Name generator 162 then generates a content-based name for each resource. In one example, it appends the hash value generated by generator 160 for each resource 156-158 to the end of the name of that resource. This is indicated by block 212. In that case, each resource will thus have a name that has the content-specific value (e.g., the hash value) appended to it.

As one example, a resource 156 may have a resource name of "MyScript.js". Content-based value generator 160 may generate a hash value based on the content of resource 156, and the hash value may be "1234567890". Name generator 162 then re-names resource 156 from "MyScript.js" to "MyScript_1234567890.js". It can thus be seen that the content of the image file represented by the hash value has been added to the name thus making the name a content-based name. Of course, the content-based name for each item can be generated in other ways as well, and this is indicated by block 214.

Re-namer 116 thus outputs the re-named resources 166-168. It provides them to version-specific catalog generator 118, and it can also load them to publication system 104, as re-named resources 126.

Catalog generator 118 generates a version-specific catalog of the interdependent items (e.g., the re-named resources 166-168). This is indicated by block 216. In one example, the version-specific catalog is an XML file as indicated by block 218. It can include the key values (e.g., the resource identifiers) 172. It can include the content-based name values 174. It can include the locale-based information 176, the culture-based information 178, and other information 180.

Table 1 below shows a snippet of an XML file that represents one example of a portion of a version-specific catalog.

```
        </Resource>
        <Resource Key="wexstyles" Type="LTRRTLPath">
            <RTLPath>/wexstyles_12683b3a.css</RTLPath>
            <LTRPath>/wexstyles_6f32d6ad.css</LTRPath>
        </Resource>
        <Resource Key="wexpmagstyles" Type="LTRRTLPath">
            <RTLPath>/wexpmagstyles_8678cd0.css</RTLPath>
            <LTRPath>/wexpmagstyles_1e0b7f25.css</LTRPath>
        </Resource>
        <Resource Key="wexbckimgL" Type="Path">
            <Path>/wexbckimgl_458c4c2.jpg</Path>
        </Resource>
        <Resource Key="wexDoughboy" Type="Path">
            <Path>/wexdoughboy_4a085aea.png</Path>
        </Resource>
        <Resource Key="wexstorycomments" Type="Path">
            <Path>/wexstorycomments_ed4524b2.htm</Path>
        </Resource>
        <Resource Key="wextestappscripts" Type="Path">
```

It can be seen in Table 1 that each of the items is a resource that is represented by a resource key (or resource identifier). It is also represented by a resource type. In the example shown in Table 1, each resource also has two different paths associated with it. One path corresponds to a culture that reads items right-to-left (the "RTL Path") and the other path corresponds to a culture that reads items left-to-right (the "LTR Path"). It can be seen that each path includes a hash value appended to it. For instance, the resource having the resource identifier "wexstyles" has a content-based name (which also acts as a resource locator, or path to the particular resource) for the resource that is to be used in a culture that reads right-to-left. The name is "wexstyle_12683b3a.css". The value "12683b3a" is the hash value (or content-specific value) for that particular resource.

The re-named items (e.g., the re-named resources 166-168), and the corresponding catalog 128, are loaded to publication system 104 where they can be consumed by various consumer systems 106-108. This is indicated by block 219 in FIG. 2. As the various values of the resources change, the version-specific catalogs 128 are updated on publication system 104. This is indicated by block 220. This can be done, for instance, in real time as indicated by block 222, or it can be done in other ways as indicated by block 224.

Figure 3:
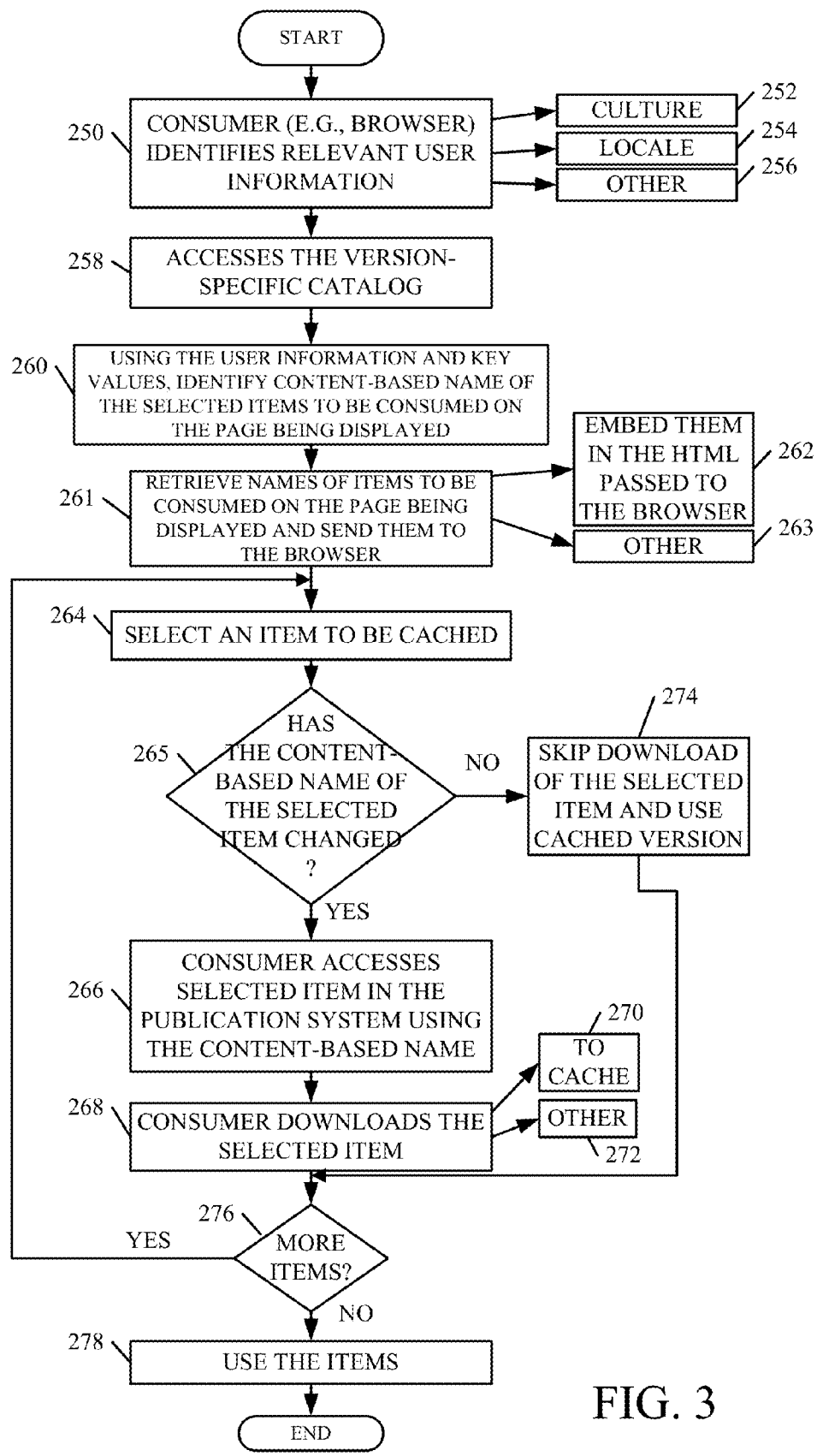
FIG. 3 is a flow diagram illustrating one example of the operation of the architecture shown in FIG. 1 in consuming the items using the version-specific catalog.

FIG. 3 is a flow diagram illustrating one example of the operation of a consumer system 106 in consuming the re-named resources 126. In one example, the consumer (e.g., a browser 140) identifies relevant user information. This is indicated by block 250 in FIG. 3. The relevant user information may include culture information that identifies the culture in which the consumer system 106 is deployed. This is indicated by block 252. It may include locale information that identifies a locale 254 where the consumer system 106 is deployed, and it can include other information 256.

The server 120 then accesses the version-specific catalog 128 for the resources to be used. This is indicated by block 258. The version-specific catalog 258 will identify a set of items (e.g., resources) to be cached in browser cache 144. The server 120 can use the user information and key values to identify the content-based name of the items to be consumed on a page being displayed. This is indicated by block 260. It then retrieves those items and sends them to browser 140. This is indicated by block 261. It can do this by embedding them into HTML sent to the browser 140, as indicated by block 262 or in other ways, as indicated by block 263.

Browser 140 selects an item to be cached, as indicated by block 264. In one example, the content-based name is used as the URL (or path) that identifies the location of the corresponding resource. Either server 120 or browser 140 illustratively determines whether the content-based name of the selected resource has changed. This is indicated by block 265. If it has changed, then this means that, for the version being downloaded, the content of the resource is different from the previous version of the resource. Thus, the browser needs to again download the re-named resource.

Therefore, the browser accesses the selected item (e.g., the re-named resource 126) in the publication system 104 using the content-based name that it has obtained from the server 120 (which got it from resource catalog 128). This is indicated by block 266. It then downloads the selected item (e.g., the re-named resource 126) to the browser cache 144. This is indicated by blocks 268 and 270. Of course, it can download it in other ways as well, as indicated by block 272.

If, at block 264, it is determined that the content-based name of the resource has not changed since it was last downloaded, then browser 140 skips download of the selected item (e.g., this selected resource) and uses the cached version of the resource instead. This is indicated by block 274.

At block 276, it is determined whether there are more items that are to be downloaded. If so, processing reverts to block 260 where the browser selects the next item to be cached and determines whether its content has changed. However, if it has now downloaded all of the items (e.g., resources) that it needs, it proceeds to use those items from browser cache 144. This is indicated by block 278.

It can thus be seen that the present system provides an architecture in which the dependencies or other characteristics of items that are operated on (e.g., that are compiled) can be taken advantage of. For instance, a compiler can take advantage of the dependencies or other characteristics of the code to be compiled in performing its operation, and this makes the outcome of the compilation more fully optimized in terms of speed and size. However, the content of each of the compiled items is reflected in its name. Therefore, when they are placed on publication system 104, consumers, such as browsers, can determine whether those items need to be re-downloaded into the browser cache before they are used. If the content of an item has not changed from the previously compiled version, then it need not be downloaded and the cached version of that item can be used instead. Thus, consumers can still take advantage of efficiencies in the system as well. This makes the download process much more efficient and greatly extends the life of the browser cache. All of these things significantly improve the operation of the system.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
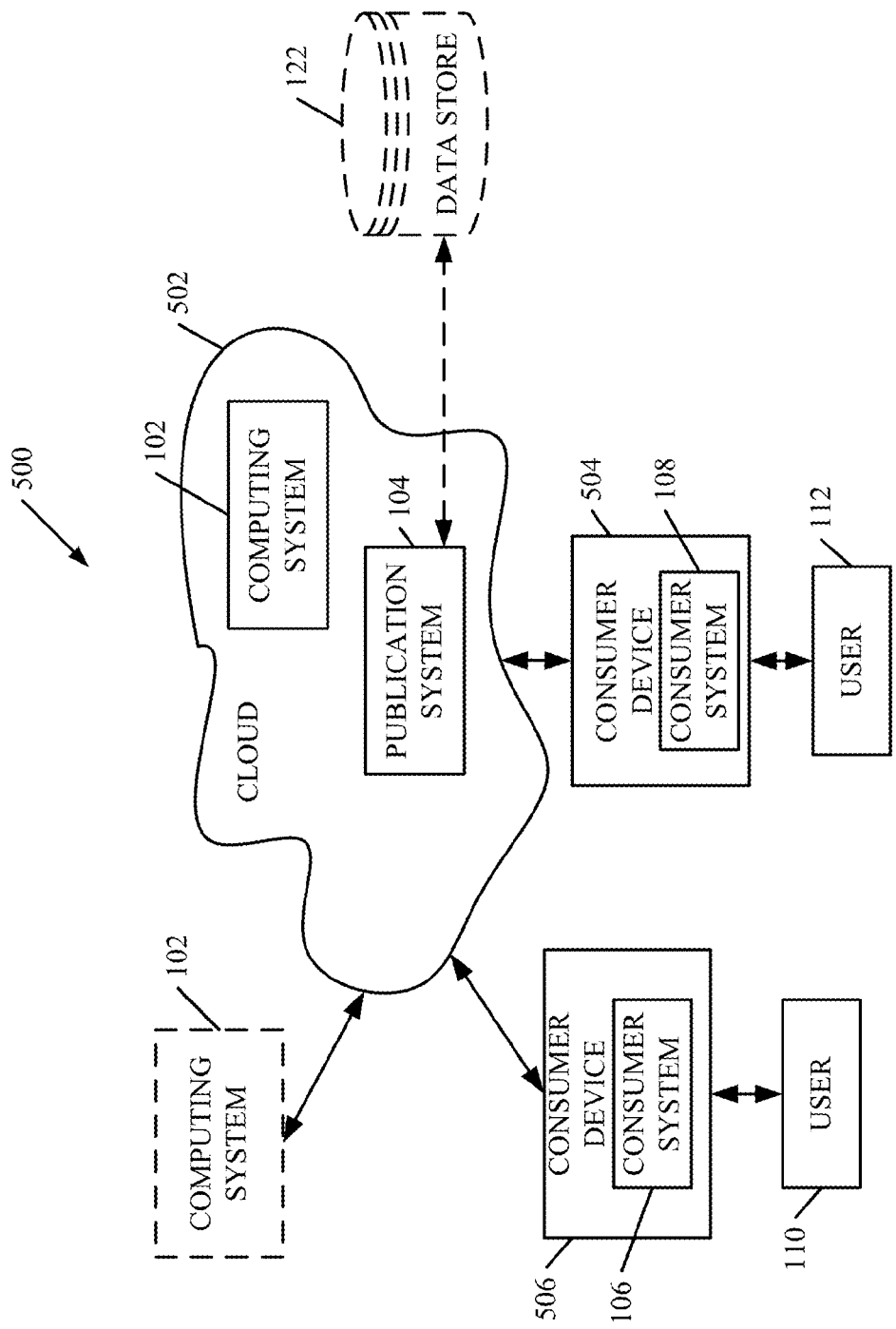
FIG. 4 is a block diagram of one example of the architecture shown in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102 and publication system 104 can be located in cloud 502 (which can be public, private, or a combination where portions are public while others are private). Therefore, users 110 and 112 use a consumer devices 504 and 506 that include consumer systems 106 and 108 to access those systems through cloud 502.

FIG. 4 also depicts another example of a cloud architecture. FIG. 4 shows that it is also contemplated that some elements of architecture 100 can be disposed in cloud 502 while others are not. By way of example, data store 122 can be disposed outside of cloud 502, and accessed through cloud 502. In another example, computing system 102 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
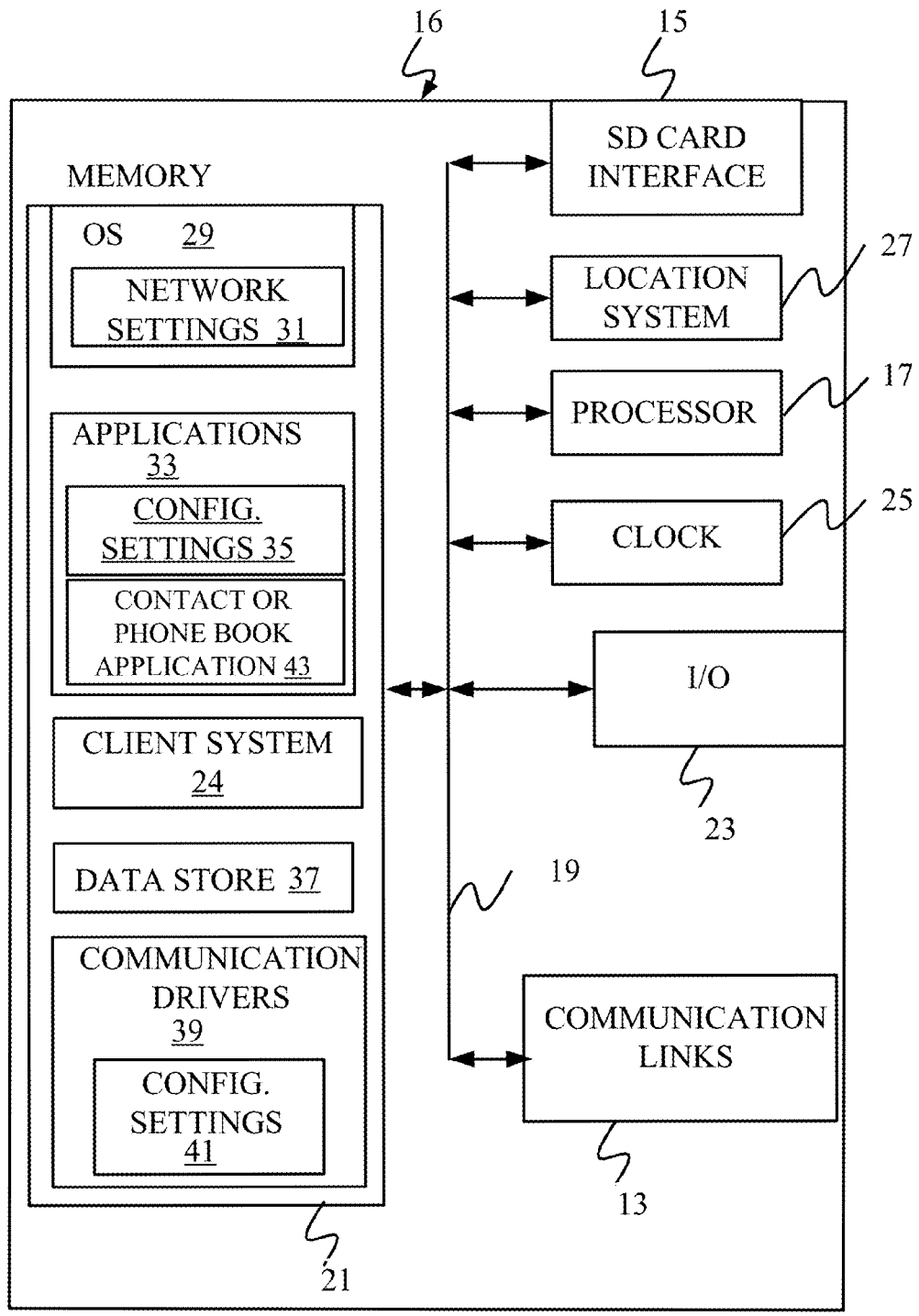
FIGS. 5-7 show examples of mobile devices that can be used in the architectures shown in the previous figures.
Figure 6:
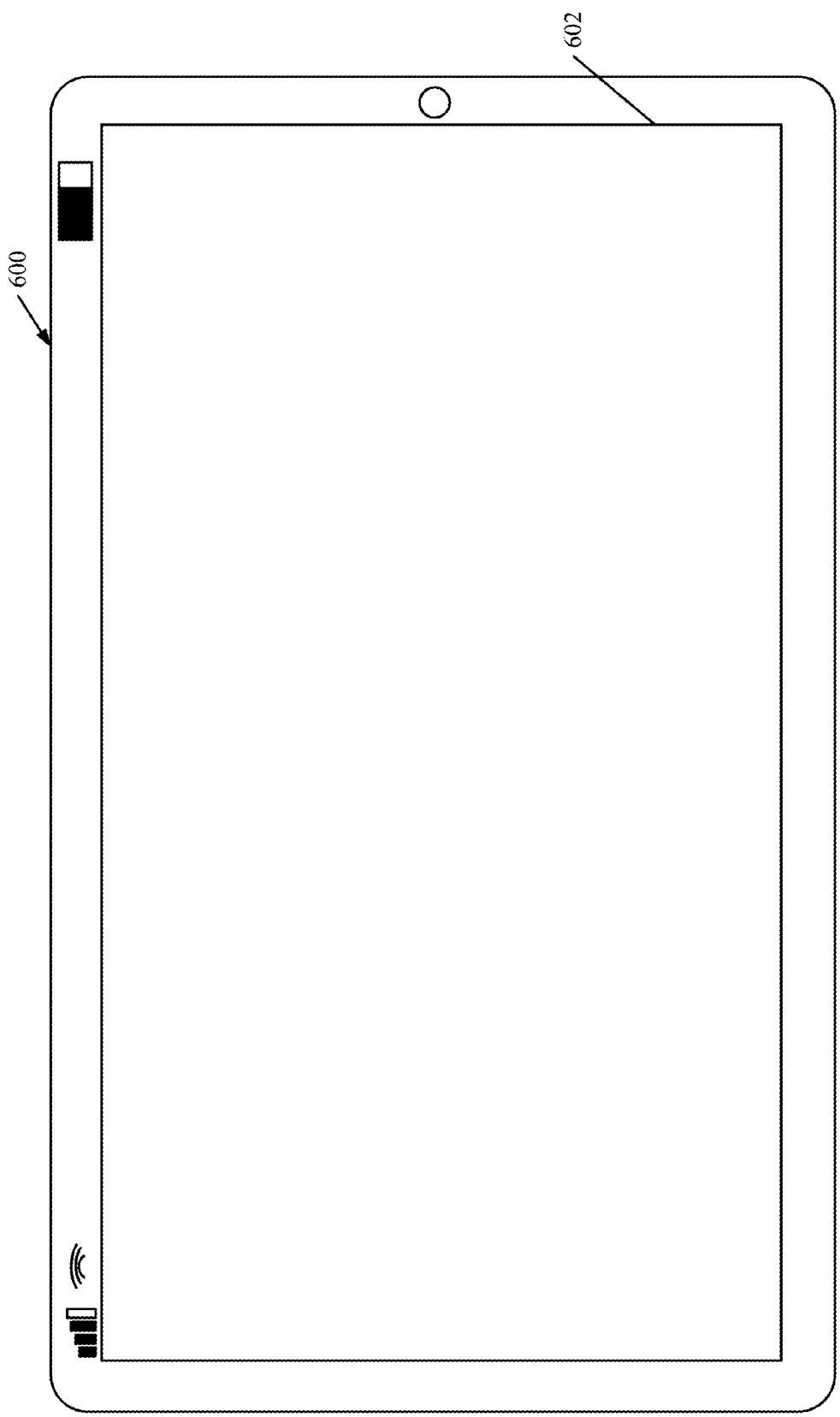
Figure 7:
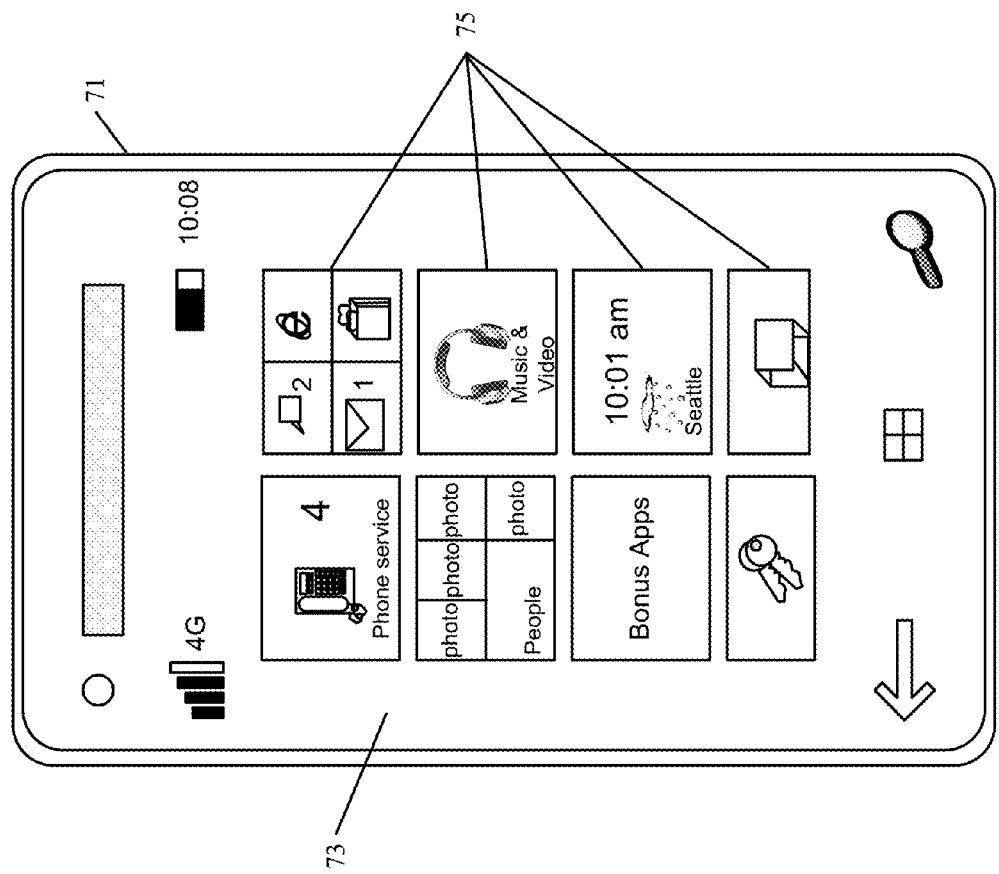

FIG. 5 is a simplified block diagram of one example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 120, 132, 134 from FIG. 1 or other processors or servers in the system) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
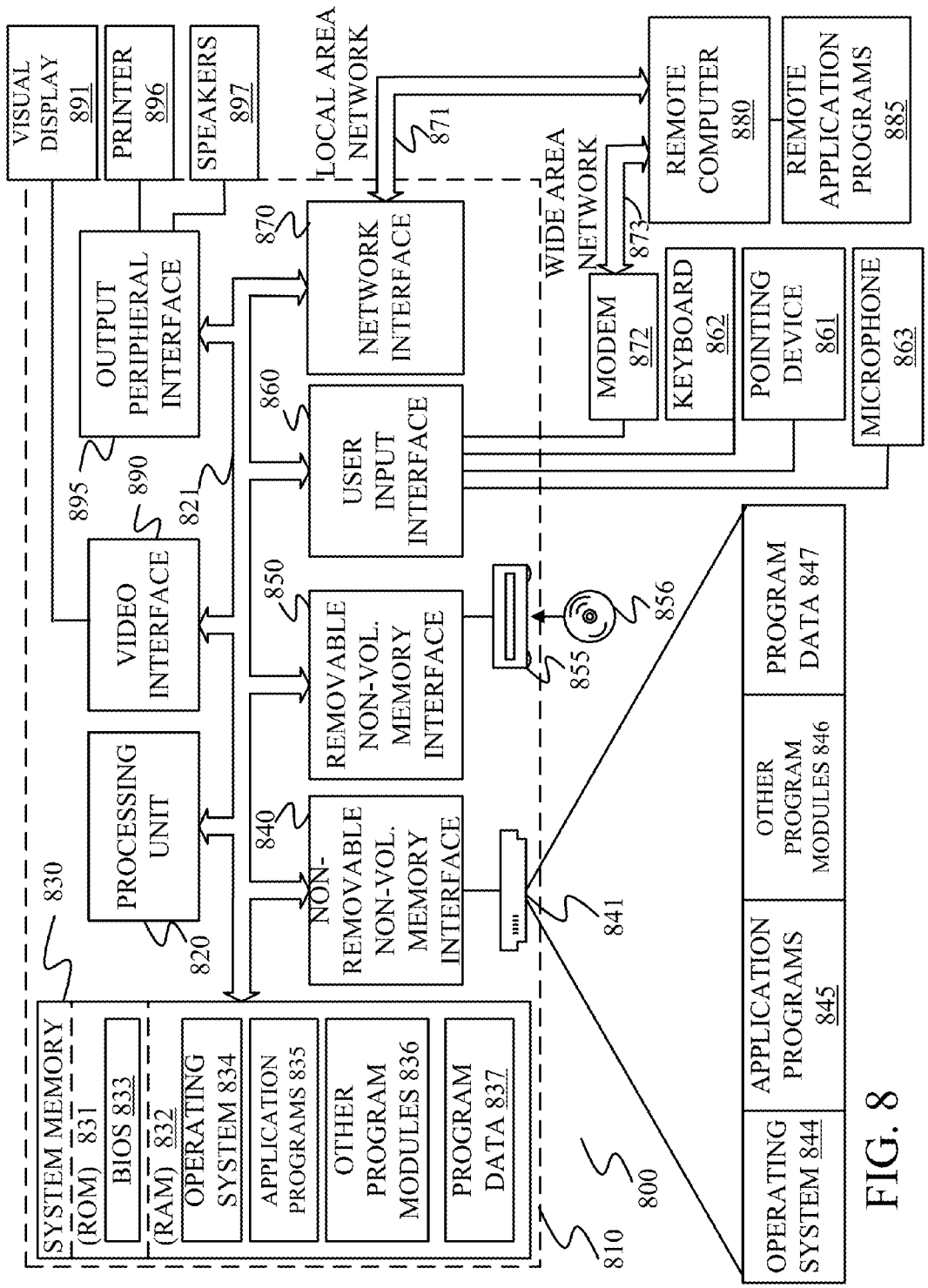
FIG. 8 is a block diagram of one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments of a general-purpose computing device in the form of a computer 810. Components of computer 810 may include, but are not limited to, a processing unit 820 (which can comprise processors 120, 132, 134 or other processors or servers in the architecture), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a cross-code operator component that receives a set of input code elements and performs an operation to generate a set of interdependent items based on the input code elements;
a resource re-namer component that re-names the interdependent items to generate a set of re-named items, each having a content-based name; and
a version-specific catalog generator that generates a catalog of the interdependent items, indicating that the interdependent items were operated on by the cross-code operator component during a same operation.

Example 2 is the computing system of any or all previous examples wherein the resource re-namer component comprises:
a content-based value generator that receives the interdependent items and generates a content-based value for each of the interdependent items based on a content of each of the interdependent items.

Example 3 is the computing system of any or all previous examples wherein the resource re-namer component comprises:
a name generator that incorporates the content-based value for each given interdependent item into a name for the given interdependent item to generate the re-named items.

Example 4 is the computing system of any or all previous examples wherein the content-based value generator comprises:
a hash generator that generates the content-based value as a hash value generated based on the content of the each of the interdependent items.

Example 5 is the computing system of any or all previous examples wherein the name generator appends the hash value for the given interdependent item to a name of the given interdependent item to obtain a given re-named item.

Example 6 is the computing system of any or all previous examples wherein the cross-code operator component comprises:
a compiler that compiles the set of input code elements, using common characteristics of the input code elements to generate the interdependent code elements.

Example 7 is the computing system of any or all previous examples wherein the cross-code operator component comprises:
a minifier that minifies the set of input code elements, using common characteristics of the input code elements to generate the interdependent code elements.

Example 8 is the computing system of any or all previous examples wherein the version-specific catalog generator generates the version-specific catalog to include, for each of the re-named items, a corresponding item identifier, and the corresponding content-based name that comprises a navigation path to a location of the corresponding re-named item.

Example 9 is the computing system of any or all previous examples wherein the version-specific catalog generator generates the version-specific catalog to include, for each of the re-named items, locale-specific information and culture-based information corresponding to the re-named items.

Example 10 is the computing system of any or all previous examples wherein the version-specific catalog generator provides the version-specific catalog to a publication system and identifies a location, on the publication system, of each of the interdependent items.

Example 11 is a computing system, comprising:
a browser cache; and
a browser component that accesses a catalog of interdependent items, indicating that the interdependent items were operated on by a cross-code operator component during a same operation, the catalog including content-dependent names of each interdependent item in the catalog, the browser comparing the content-dependent name of a given interdependent item to a content-dependent name of an interdependent item in the browser cache and downloading the given interdependent item to the browser cache if the content-dependent names are different from one another.

Example 12 is the computing system of any or all previous examples wherein the browser component skips downloading of the interdependent item to the browser cache if the content-dependent names are the same as one another.

Example 13 is a computer implemented method, comprising:

performing an operation on a set of input code items to generate a set of interdependent items based on the input code elements;

re-naming the interdependent items to generate a set of re-named items, each having a content-based name; and generating a catalog of the interdependent items, indicating that the interdependent items were operated on by the cross-code operator component during a same operation.

Example 14 is the computer implemented method of any or all previous examples wherein re-naming comprises:

generating a content-based value for each of the interdependent items based on a content of each of the interdependent items.

Example 15 is the computer implemented method of any or all previous examples wherein re-naming comprises:

incorporating the content-based value for each given interdependent item into a name for the given interdependent item to generate the re-named items.

Example 16 is the computer implemented method of any or all previous examples wherein generating a content-based value comprises:

generating the content-based value as a hash value generated based on the content of the each of the interdependent items.

Example 17 is the computer implemented method of any or all previous examples wherein incorporating comprises:

appending the hash value for the given interdependent item to a name of the given interdependent item to obtain a given re-named item.

Example 18 is the computer implemented method of any or all previous examples wherein performing an operation comprises:

compiling the set of input code elements, using common characteristics of the input code elements to generate the interdependent code elements.

Example 19 is the computer implemented method of any or all previous examples wherein performing an operation comprises:

minifiying the set of input elements, using common characteristics of the input code elements to generate the interdependent code elements.

Example 20 is the computer implemented method of any or all previous examples wherein generating a catalog comprises:

generating the catalog to include, for each of the re-named items, a corresponding item identifier, the corresponding content-based name that comprises a navigation path to a location of the corresponding re-named item, locale-specific information and culture-based information corresponding to the re-named items.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, configure the computing system to provide:
  a cross-code operator component configured to:
    receive a set of input code elements; and
    perform an operation to generate a set of interdependent items based on the set of input code elements and a dependency between the set of input code elements,
      wherein each interdependent item has a corresponding name and a corresponding item identifier that identifies the interdependent item;
  a resource re-namer component configured to:
    re-name the set of interdependent items to generate a set of re-named interdependent items, each re-named interdependent item corresponding to one of the interdependent items and having a content-based name that is based on content of the corresponding interdependent item, wherein the content comprises content generated by the operation performed by the cross-code operator component; and
  a catalog generator configured to:
    generate a catalog indicating that the set of interdependent items are consumable with one another, wherein, for each interdependent item, the catalog maps the corresponding item identifier, that identifies the interdependent item, to the content-based name for the interdependent item.

2. The computing system of claim 1 wherein the resource re-namer component comprises:
a content-based value generator configured to:
  receive the set of interdependent items and, for each of the interdependent items, generate a content-based value for the interdependent item based on the content of the interdependent item, wherein the content-based name of the interdependent item is based on the content-based value for the interdependent item.

3. The computing system of claim 2 wherein the resource re-namer component comprises:
a name generator configured to incorporate the content-based value for each corresponding interdependent item into a name for the corresponding interdependent item to generate the set of re-named interdependent items.

4. The computing system of claim 3 wherein the content-based value generator comprises:
a hash generator configured to generate, for each of the interdependent items, the content-based value as a hash value generated based on the content the interdependent item.

5. The computing system of claim 4 wherein the name generator is configured to append the hash value for the corresponding interdependent item to a name of the corresponding interdependent item to obtain a corresponding re-named interdependent item.

6. The computing system of claim 3 wherein the cross-code operator component comprises:

a compiler configured to compile the set of input code elements, using common characteristics of the input code elements to generate the set of interdependent items.

7. The computing system of claim 3 wherein the cross-code operator component comprises:
a minifier configured to minify the set of input code elements, using common characteristics of the set of input code elements to generate the set of interdependent items.

8. The computing system of claim 1 wherein the catalog generator is configured to generate the catalog to include, for each of the re-named interdependent items, the corresponding content-based name that comprises a navigation path to a location of the corresponding re-named interdependent item.

9. The computing system of claim 8 wherein the catalog generator is configured to generate the version-specific catalog to include, for each of the re-named interdependent items, locale-specific information and culture-based information corresponding to the re-named interdependent items.

10. The computing system of claim 1 wherein the catalog generator is configured to provide the catalog to a publication system and identify a location, on the publication system, of each of the interdependent items.

11. A computing system, comprising:
at least one processor; and
memory storing instructions executable by the at least one of processor, wherein the instructions, when executed, provide:
a browser component configured to:
access a set of interdependent items identified from a catalog of interdependent items, the catalog indicating that the set of interdependent items are consumable with one another,
wherein, for each interdependent item, the catalog includes a content-dependent name that is based on content of the interdependent item; and
wherein, for each interdependent item, the catalog maps a corresponding item identifier, that identifies the interdependent item, to the content-dependent name for the interdependent item; and
select one of the interdependent items;
compare the content-dependent name corresponding to the selected interdependent item to a content-dependent name of an interdependent item in a browser cache; and
download the selected interdependent item to the browser cache if the content-dependent names are different from one another.

12. The computing system of claim 11 wherein the browser component is configured to skip downloading of the selected interdependent item to the browser cache if the content-dependent name corresponding to the selected interdependent item is the same as the content dependent name of the interdependent item in the browser cache.

13. A computer implemented method, comprising:
performing, by a cross-code operator, an operation on a set of input code elements to generate a set of interdependent items based on the set of input code elements and a dependency between the set of input code elements, wherein each interdependent item has a corresponding name and a corresponding item identifier that identifies the interdependent item;
re-naming the set of interdependent items to generate a set of re-named interdependent items, each re-named interdependent item corresponding to one of the interdependent items and having a content-based name that is based on content of the corresponding interdependent item, wherein re-naming comprises:
for each of the interdependent items, generating a content-based value based on the content of the interdependent item, wherein the content comprises content generated by the operation performed by the cross-code operator; and
generating a catalog indicating that the set of interdependent items are consumable with one another, wherein, for each interdependent item, the catalog maps the corresponding item identifier, that identifies the interdependent item, to the content-based name for the interdependent item.

14. The computer implemented method of claim 13 wherein re-naming comprises:
for each interdependent item, incorporating the content-based value for the interdependent item into a name for the interdependent item to generate the re-named interdependent item corresponding to the interdependent item.

15. The computer implemented method of claim 14 wherein generating a content-based value comprises:
for each interdependent item, generating the content-based value for the interdependent item as a hash value generated based on the content the interdependent item.

16. The computer implemented method of claim 15 wherein incorporating comprises:
for each interdependent item, appending the hash value for the interdependent item to a name of the interdependent item to obtain the re-named interdependent item corresponding to the interdependent item.

17. The computer implemented method of claim 14 wherein performing an operation comprises:
compiling the set of input code elements, using common characteristics of the set of input code elements to generate the set of interdependent items.

18. The computer implemented method of claim 14 wherein performing an operation comprises:
minifiying the set of input code elements, using common characteristics of the set of input code elements to generate the set of interdependent items.

19. The computer implemented method of claim 13 wherein generating a catalog comprises:
generating the catalog to include, for each of the re-named interdependent items,
the corresponding item identifier, the corresponding content-based name that comprises a navigation path to a location of the re-named interdependent item, locale-specific information, and culture-based information corresponding to the re-named interdependent item.

* * * * *